United States Patent [19]

Mishima et al.

[11] Patent Number: 5,466,750

[45] Date of Patent: Nov. 14, 1995

[54] NONFLAMMABLE INJECTION-MOLDING RESIN COMPOSITION

[75] Inventors: Ikuhiro Mishima; Munehiro Ikeda; Hideki Hosoi, all of Hyogo, Japan

[73] Assignee: Kanegafuchi Kagaku Kogyo Kabushiki Kaisha, Osaka, Japan

[21] Appl. No.: 217,759

[22] Filed: Mar. 25, 1994

Related U.S. Application Data

[63] Continuation of Ser. No. 678,424, Apr. 1, 1991, abandoned.

[30] Foreign Application Priority Data

Mar. 30, 1990 [JP] Japan ......................... 2-87023

[51] Int. Cl.$^6$ ............... C08L 55/02; C08L 27/06; C08L 25/12; C08L 33/08
[52] U.S. Cl. ............... 525/84; 525/85; 525/238; 525/239; 525/241; 525/227
[58] Field of Search ................. 525/84, 85, 227, 525/238, 239, 241

[56] References Cited

U.S. PATENT DOCUMENTS

| | | | |
|---|---|---|---|
| 3,673,283 | 6/1972 | Tanaka et al. | 525/230 |
| 3,862,264 | 1/1975 | Nojima et al. | 260/876 R |
| 4,045,382 | 8/1977 | Braese et al. | 525/151 |
| 4,337,324 | 6/1982 | Yusa et al. | 525/72 |
| 4,490,283 | 12/1984 | Kleiner | 524/439 |
| 4,518,515 | 5/1985 | Ott et al. | 525/79 |
| 4,518,743 | 5/1985 | Lindner et al. | 525/80 |
| 4,596,669 | 6/1986 | Kleiner et al. | 524/496 |
| 4,609,701 | 9/1986 | Jones et al. | 525/207 |
| 4,710,533 | 12/1987 | Neuman | 525/238 |
| 4,797,442 | 1/1989 | Neuman | 525/196 |

FOREIGN PATENT DOCUMENTS

| | | |
|---|---|---|
| 59-51935 | 3/1984 | Japan . |
| 59-51929 | 3/1984 | Japan . |

OTHER PUBLICATIONS

Patent Abstracts Of Japan, vol. 10, No. 123, May 8, 1986 & JP-A-60 248 758 (Kanegafuchi Kagaku Kogyo) Sep. 12, 1985.

*Primary Examiner*—W. Robinson Clark
*Attorney, Agent, or Firm*—Armstrong, Westerman, Hattori, McLeland & Naughton

[57] ABSTRACT

A nonflammable injection-molding resin composition. The composition includes a nonflammable resin component containing a low-molecular-weight styrene resin having a high α-methylstyrene content; a rubbery polymer having grafted thereon a vinyl cyanide and/or alkyl (meth)acrylate monomer and an aromatic vinyl monomer; a low-molecular weight post-chlorinated polyvinyl chloride resin and, optionally, a vinyl chloride resin; and, as a moldability-improving agent, a specific alkyl acrylate resin comprising a vinyl cyanide monomer, an alkyl acrylate monomer and an optional copolymerizable vinyl monomer. The nonflammable resin composition provides injection-molded articles with a good balance of impact strength and non-peeling properly and is excellent in moldability.

3 Claims, No Drawings

NONFLAMMABLE INJECTION-MOLDING RESIN COMPOSITION

This application is a continuation of application Ser. No. 07/678,424 filed Apr. 1, 1991, now abandoned.

FIELD OF THE INVENTION

The present invention relates to a nonflammable injection-molding resin composition which provides an injection-molded article having excellent impact strength and a non-peeling property as well as excellent moldability in injection molding. More particularly, the present invention relates to a novel nonflammable injection-molding resin composition which comprises a nonflammable resin component containing a low-molecular-weight styrene resin having a high α-methylstyrene content; a graft copolymer of a rubbery polymer, a vinyl cyanide and/or alkyl (meth)acrylate monomer and an aromatic vinyl monomer; and a low-molecular-weight post-chlorinated polyvinyl chloride resin having a low chlorine content; and blended therewith a small amount of a polymer derived from a mixture comprising a vinyl cyanide monomer, an alkyl acrylate monomer, and another monomer copolymerizable therewith.

BACKGROUND OF THE INVENTION

Nonflammable injection-molding resins composed of a low-molecular-weight styrene resin and a low-polymerization-degree vinyl chloride resin are superior materials in view of mechanical properties and cost. Recently, these resins have been used in increased amounts as materials for housings of office automation (OA) apparatuses and the like. However, the requirements of molded articles are becoming more severe each year in OA apparatus applications. In particular, miniaturization of OA apparatuses, because it brings about an increase in internal heat generation in the apparatuses, necessitates a decrease in the thickness of the housing materials, and requires the use of highly heat-resistant resins. A general means for raising heat-resistance is to use a styrene resin which contains α-methylstyrene as a third component, or to use a post-chlorinated vinyl chloride resin.

These resins, however, are disadvantageously liable to cause jellowing and flashing of the molded articles and are not readily moldable. The disadvantages of the molded articles are considered to relate to the extremely high melt viscosity of the resins in injection molding, particularly in the case of a resin which contains a post-chlorinated vinyl chloride type resin. The use of such a resin results in large heat generation by the shearing action of metal parts such as a screw, a cylinder, a mold, etc. and causes heat decomposition of the resin. For improving the molding of such resins, methods such as the addition of a large amount of a stabilizer or a lubricant, and the addition of a moldability-improving agent comprising an alkyl acrylate type resin are generally used. The former method is not preferable, because the cost of the starting materials increases and, further, the impact strength and the heat distortion temperature are decreased adversely affecting the quality of the molded articles. The latter method, namely the addition of an alkyl acrylate type resin as a moldability-improving agent, is remarkably useful since the increase in the cost of the material is not so large and lowering of the heat distortion temperature is not remarkable. This method, however, causes a decrease of the impact strength and peeling of the molded articles. In particular, with an increase in the amount of the additive for increasing the moldability-improving effect, lowering of the impact strength and deterioration of the non-peeling property of the molded articles become remarkable. These are serious problems.

These problems are assumed to be caused by the alkyl acrylate type resin which is used as a moldability-improving agent and which is designed to improve moldability particularly of extrusion-molding vinyl chloride resins having an ordinary molecular weight. The inventors of the present invention considered the facts that the shear rate of a resin in injection molding differs greatly from that in extrusion molding, the shearing rate being in the range of from 10000 to 100000 $sec^{-1}$ in injection molding and being in the range of from 100 to 1000 $sec^{-1}$ $^{in\ extrusion\ molding}$, and that the nonflammable resin to which the moldability-improving agent is added is not a resin of ordinary molecular weight but is a special nonflammable injection-molding resin which comprises a styrene type resin having a high content of low-molecular weight α-methylstyrene and containing a post-chlorinated vinyl chloride type resin of low polymerization degree. Based on the above consideration, the present inventors comprehensively investigated moldability-improving agents of the alkyl acrylate resin type to find modifier which does not lower the effect of the moldability-improving agent, decrease impact strength, nor cause peeling of molded articles. As a result, it has been found that an alkyl acrylate copolymer having a specific composition achieves the above objective.

SUMMARY OF THE INVENTION

The present invention provides a nonflammable injection-molding resin composition superior in impact strength, non-peeling property, and moldability, the resin composition comprising:

100 parts by weight of nonflammable composition composed of (i) 15 to 80 parts by weight of a copolymer (A), composed of 60 to 85% by weight of α-methylstyrene monomer units, 15 to 35% by weight of vinyl cyanide monomer units, and 0 to 20% by weight of units of another vinyl monomer copolymerizable therewith, and having a reduced viscosity of the methyl ethyl ketone-soluble portion of 0.2 to 0.5 dl/g (N,N-dimethylformamide solution, at a temperature of 30° C. and a concentration of 0.3 g/dl), (ii) 5 to 40 parts by weight of a graft copolymer (B) prepared by graft-copolymerizing, onto 40 to 90 parts by weight of a rubbery polymer, 10 to 60 parts by weight of a monomer mixture comprising 10 to 90% by weight of vinyl cyanide monomer and/or alkyl (meth)acrylate monomer, 10 to 90% by weight of aromatic vinyl monomer, and 0 to 20% by weight of another copolymerizable vinyl monomer, (iii) 20 to 70 parts by weight of a post-chlorinated vinyl chloride resin (C) having a chlorine content of 58 to 65% and prepared by chlorinating a vinyl chloride resin having polymerization degree of 400 to 800, and (iv) 0 to 65 parts by weight of a vinyl chloride resin (D) having a polymerization degree of 400 to 800; and, blended therewith, 0.5 to 10 parts by weight of a copolymer (E) comprising 5 to 40% by weight of vinyl cyanide monomer units, 30 to 95% by weight of alkyl acrylate monomer units, and 0 to 65% by weight of units another vinyl monomer copolymerizable therewith.

DETAILED DESCRIPTION OF THE INVENTION

The copolymer (A) of the present invention is a copolymer composed of 60 to 85% by weight of α-methylstyrene monomer units, 15 to 35% by weight of vinyl cyanide monomer units, and 0 to 20% by weight of units of another vinyl monomer copolymerizable therewith, and having a reduced viscosity of the methyl ethyl ketone-soluble portion within the range of from 0.2 to 0.5 dl/g (N,N-dimethylformamide solution, at a temperature of 30° C. and a concentration of 0.3 g/dl).

The content of the α-methyl styrene monomer in the copolymer (A) is within the range of from 60 to 85% by weight. At a content below 60% by weight, the heat resistance of the final product will be lower, while at a content above 85% by weight, the polymerization conversion will be remarkably lower. The content of the vinyl cyanide monomer is within the range of from 15 to 35% by weight. At a content below 15% by weight, the polymerization conversion decreases remarkably, while at a content above 35% by weight, the heat-resistance and the impact strength decreases remarkably.

The reduced viscosity of the methyl ethyl ketone-soluble portion of the copolymer (A) is within the range of from 0.2 to 0.5 dl/g, and more preferably from 0.2 to 0.4 dl/g, at a concentration of 0.3 g/dl in dimethylformamide at 30° C. With a reduced viscosity below 0.2 dl/g, the impact strength is low, while with a reduced viscosity above 0.5 dl/g, moldability is undesirably impaired.

The vinyl cyanide monomer in the copolymer (A) can be acrylonitrile, methacrylonitrile, or the like. These monomers can be used singly or in a combination of two or more thereof.

The other copolymerizable vinyl monomer in the copolymer (A) can be an aromatic monomer such as styrene, p-methylstyrene and chlorostyrene; a (meth)acrylic acid or an alkyl (meth)acrylate such as methyl methacrylate, butyl methacrylate, 2-ethylhexyl methacrylate, methyl acrylate, ethyl acrylate, butyl acrylate and methacrylic acid; and an imide or amide such as phenylmaleimide, acrylamide and methacrylamide, which can be used singly or in combination of two or more thereof.

The graft copolymer (B) of the present invention is a copolymer prepared by graft-copolymerizing, onto 40 to 90 parts by weight of a rubbery polymer, 10 to 60 parts by weight of a monomer mixture comprising 10 to 90% by weight of vinyl cyanide monomer and/or alkyl (meth)acrylate monomer, 10 to 90% by weight of aromatic vinyl monomer, and 0 to 20% by weight of another vinyl monomer copolymerizable therewith.

In the graft copolymer (B), the content of the rubbery polymer is within the range of from 40 to 90 parts by weight. Amounts of less than 40% and more than 90% are undesirable because the impact strength of the final product is lower. The content of the vinyl cyanide and/or alkyl (meth)acrylate in the monomer mixture is within the range of from 10 to 90% by weight. Outside this range, the impact strength decreases undesirably. The content of the aromatic vinyl monomer is within the range of from 10 to 90% by weight. Outside this range, the impact strength decreases undesirably.

The rubbery polymer in the graft copolymer (B) can be for example, a diene rubber such as polybutadiene rubber, styrene-butadiene copolymer rubber (SBR) and acrylonitrile-butadiene rubber (NBR); an acryl rubber such as polybutyl acrylate; and a polyolefin rubber such as ethylenepropylenediene terpolymer (EPDM). The vinyl cyanide monomer can be acrylonitrile, methacrylonitrile, or the like. The alkyl (meth)acrylate can be methyl methacrylate, ethyl methacrylate, ethyl acrylate, butyl acrylate, and the like. The aromatic vinyl monomer can be styrene, α-methylstyrene, methylstyrene, chlorostyrene, and the like. Further, the other copolymerizable vinyl monomer can be acrylic acid, methacrylic acid, phenylmaleimide, or the like. These monomers can be used singly or in a combination of two or more thereof.

The post-chlorinated vinyl chloride resin (C) of the present invention is a post-chlorinated vinyl chloride resin containing chlorine in an amount of 58 to 65% prepared by chlorinating a vinyl chloride resin having a polymerization degree of 400 to 800.

The vinyl chloride resin before the post-chlorination preferably has a polymerization degree of from 400 to 800, and more preferably from 400 to 700. At a polymerization degree of the vinyl chloride resin of below 400, the impact strength is lower, while at a polymerization degree of above 800, the moldability is greatly impaired. The vinyl chloride resin before post-chlorination can be a homopolymer, or a copolymer composed of 80% by weight or more of vinyl chloride and 20% by weight or less of a copolymerizable monomer. The monomer copolymerizable with vinyl chloride can be a monovinylidene compound such as ethylene, vinyl acetate, methyl methacrylate and butyl acrylate. These may be used singly or in a combination of two or more thereof.

The chlorine content of the post-chlorinated vinyl chloride resin (C) is within the range of from 58 to 65% by weight, and preferably from 59 to 64%. At a chlorine content of the post-chlorinated vinyl chloride resin (C) of below 58%, heat resistance is greatly lowered, while at a content above 65%, the moldability is considerably impaired.

The vinyl chloride resin (D) of the present invention has a polymerization degree of from 400 to 800, and preferably of from 400 to 700. With a polymerization degree below 400, impact strength is lower, while with a polymerization degree above 800 the moldability is considerably impaired. The vinyl chloride resin (D) includes homopolymers and copolymers composed of 80% by weight or more of vinyl chloride and 20% by weight or less of a monomer copolymerizable therewith. The monomers copolymerizable with vinyl chloride can be monovinylidene compounds such as ethylene, vinyl acetate, methyl methacrylate, butyl acrylate, or the like. These may be used singly or in a combination of two or more thereof.

In the nonflammable resin of the present invention, the content of the copolymer (A) is from 15 to 80 parts by weight. At a content below 15 parts by weight, the heat resistance is lower, while at a content above 80 parts by weight the nonflammability becomes lower, which is not preferred. The content of the graft copolymer (B) is in the range of from 5 to 40 parts by weight. At a content below 5 parts by weight, the impact strength is lower, while at a content above 40 parts by weight the heat resistance is lower. The content of the post-chlorinated vinyl chloride resin (C) is in the range of from 20 to 70 parts by weight. At a content below 20 parts by weight, the nonflammability is lower, while at a content above 70 parts by weight, the moldability is lower. The content of the vinyl chloride type resin (D) is in the range of from 0 to 65 parts by weight, preferably from 0 to 30 parts by weight. At a content above 65 parts by weight, the heat-resistance is undesirably lower.

The copolymer (E) to be blended with the aforementioned nonflammable resin composition (R) to give high moldability without impairing the impact strength nor causing peeling of the molded articles is composed of from 5 to 40% by weight of vinyl cyanide monomer, from 30 to 95% by weight of alkyl acrylate monomer, and from 0 to 65% by weight of another copolymerizable vinyl monomer.

The vinyl cyanide monomer in the copolymer (E) of the present invention can be arcylonitrile, methacrylonitrile, or the like, which can be used singly or in a combination of two or more thereof. The vinyl cyanide monomer is contained in the (E) component copolymer in an amount of from 5 to 40% by weight to achieve the significant improvement in impact strength, non-peeling property of the molded articles, and moldability. The content of the vinyl cyanide monomer in the copolymer (E) is more preferably within the range of from 7 to 35% by weight.

The preferred alkyl acrylate monomers for use in the copolymer (E) of the present invention include those having an alkyl of the alcohol residue of 2 to 8 carbon atoms such as ethyl acrylate, butyl acrylate, 2-ethylhexyl acrylate, and the like. The other copolymerizable vinyl monomer can be, for example, an alkyl methacrylate such as methyl methacrylate, butyl methacrylate and 2-ethylhexyl methacrylate and an aromatic vinyl compound such as styrene, α-methylstyrene which can be used singly or in a combination of two or more thereof.

The molecular weight of the copolymer (E) in the present invention is preferably within the range of from 500 to 200000, and more preferably from 5000 to 100000. With a molecular weight below 5000, impact strength is considerably impaired, while above 200000 the heat stability during injection molding is considerably decreased, which is undesirable.

The amount of the copolymer (E) to be used is within the range of from 0.5 to 10 parts by weight, and preferably from 1 to 8 parts by weight, based on 100 parts by weight of the nonflammable resin composition (R). With an amount below 0.5 part by weight, the effect of the addition is not sufficiently achieved, while with an amount above 10 parts by weight the impact strength is considerably decreased.

The copolymer (E) of the present invention can be readily synthesized by a usual emulsion polymerization using a thermal decomposition type initiator or a redox initiator such as KPS or the like. In one embodiment of the present invention, for the purpose of adjusting the properties of the dried powder obtained in the polymerization of copolymer (E), an ethylenic unsaturated monomer such as methyl methacrylate, vinyl chloride, styrene, α-methylstyrene, acrylonitrile or the like which gives a hard polymer compatible with the vinyl chloride polymer, or a mixture of two or more thereof is further added and is polymerized in the presence of the copolymer (E). In another embodiment, the polymerization of the copolymer (E) is conducted in the presence of a styrene resin or a vinyl chloride resin. Further, the copolymer (E) may be blended in a latex state with a hard polymer latex compatible with the vinyl chloride polymer.

As described above, the present invention relates to a nonflammable injection-molding resin composition characterized in that a copolymer (E) as a specific modifier is incorporated as an essential component into a nonflammable resin composition (R) which comprises a mixture of a specific styrene type resin with a post-chlorinated vinyl chloride resin. The composition of the present invention can contain additionally a known antioxidant, a heat stabilizer, or a lubricant, and further, if necessary, a UV absorber, a pigment, an antistatic agent, a flame-retardant, or a flame-retarding auxiliary. In particular, a phenol-type antioxidant and a phosphite-type stabilizer Used for styrene resins; a tin-type stabilizer and a lead-type stabilizer used for post-chlorinated polyvinyl chloride resins and vinyl chloride resins; and internal or external lubricants such as fatty acid esters, metal soaps, waxes, and the like can be used in order to attain better performance of the composition of the present invention as an injection-molding resin. Although the composition of the present invention itself exhibits satisfactory nonflammability owing to the effectiveness of the post-chlorinated vinyl chloride resin, a small amount of flame retarding auxiliary such as a halogen type flame retardant, an antimony compound, or the like can be combined with the composition depending of the need for nonflamability.

The present invention is described in more detail in the following Examples and Comparative Examples which do not limit the invention in any way. The term "part(s)" and "percent(s)" in the Examples, Comparative Examples, and Tables is based on weight.

EXAMPLE 1

(a) Synthesis of Copolymer (E-1):

In a reaction vessel equipped with a stirrer and a cooler, were added 250 parts of water and 3 parts of sodium palmitate as an emulsifier. The temperature thereof was raised to 60° C., and the interior of the vessel was deaerated and sufficiently purged with nitrogen. Then, 0.4 part of sodium formaldehyde sulfoxylate, 0.01 part of ethylenediamine tetraacetate and 0.0025 part of ferrous sulfate were added thereto. Having confirmed the internal temperature to be 60° C., a mixture of 12 parts of acrylonitrile, 60 parts of butyl acrylate, 18 parts of styrene, 10 parts of α-methylstyrene, 0.6 part of tert-dodecyl mercaptan and 0.1 part of cumene hydroperoxide was added continuously over a period of 5 hours. After completion of the addition, the contents of the vessel were stirred for 1 hour with the internal temperature kept at 60° C. thereby obtaining a copolymer latex. The latex was salted out, and granulated to prepare the copolymer (E-1) for use in the present invention.

(b) Preparation of nonflammable injection-molding resin composition containing the copolymer (E-1):

5 Parts of the copolymer (E-1) synthesized in (a) above, and as the nonflammable resin composition (R), a mixture of 35 parts of copolymer (A-1) shown in Table 2, 15 parts of the graft copolymer (B-1) shown in Table 3, 50 parts of post-chlorinated vinyl chloride resin (C-1) shown in Table 4, 2 parts of dibutyltin maleate and 1 part of tinmercapto acid ester as tin stabilizers, and 1 part of glycerin tristearate and 1 part of polyethylene wax as a lubricant were blended by means of a super-mixer, and pelletized by a 40-mm extruder, thereby preparing pellets of the nonflammable injection-molding resin composition of the present invention.

EXAMPLES 2–14, and COMPARATIVE EXAMPLES 1–27

The copolymers (E-2)–(E-13) shown in Table 1, and the nonflammable injection-molding resin compositions shown in Table 5 were prepared in the same manner as in Example 1.

The nonflammable resin compositions (R) were prepared from a copolymer (A) and a graft copolymer (B) having the compositions shown in Table 2 and Table 3, and a post-chlorinated resin (C) and a vinyl chloride resin (D) having the compositions shown in Table 4.

From the pellets prepared in the manner as described above, test specimens were molded by means of a 5-ounce injection machine under molding conditions of a screw rotation speed of 80 rpm and a nozzle temperature set at 190° C. The results of the tests of properties of the specimens are shown in Table 6.

The non-peeling property of the molded article was evaluated by peeling at the gate portion of a 1.2 mm-thick molded flat plate.

The non-peeling property of the molded article was evaluated in five grades. The best ones were evaluated as grade "5", and the worst ones were evaluated as grade "1". Therefore, a higher grade number in the evaluation means better non-peeling property of the molded article.

The moldability was evaluated by determining the flow length of the resin in a spiral flow mold of 3 mm thickness and 10 mm breadth. The impact strength was evaluated by an Izod impact test. The nonflammability was evaluated according to the UL-94 Standard.

The test results shown in Table 6 demonstrate that the nonflammable injection-molding resin composition has well balanced properties of non-peeling property of the molded-article, heat-resistance, impact strength, moldability, and nonflammability only in those cases where all of the components (A) to (E) are contained in ratios as specified in the present invention.

As described above, the present invention provides a nonflammable injection-molding resin composition having a good balance of non-peeling property, heat-resistance, impact strength, moldability, and nonflammability.

While the invention has been described in detail and with reference to specific embodiments thereof, it will be apparent to one skilled in the art that various changes and modifications can be made therein without departing from the spirit and scope thereof.

TABLE 3

| | Graft Copolymer (B) | | | | | | |
|---|---|---|---|---|---|---|---|
| | B-1 | B-2 | B-3 | B-4 | B-5 | B-6 | B-7 |
| Rubbery polymer | | | | | | | |
| PBd*1 | 65 | 65 | — | 30 | 95 | 65 | 65 |
| PBA*2 | — | — | 65 | — | — | — | — |
| Monomer | | | | | | | |
| St | 7 | 26 | 7 | 14 | 1 | 3 | 32 |
| AN | — | 9 | — | — | — | 32 | — |
| MMA | 28 | — | 28 | 56 | 4 | — | 3 |

*1 Polybutadiene rubber having average particle size of 1500Å.
*2 Polybutyl acrylate rubber having average particle size of 2300Å.

TABLE 4

| | Post-chlorinated Vinyl Chloride Resin (C) and Vinyl Chloride Resin (D) | | | | | |
|---|---|---|---|---|---|---|
| | C-1 | C-2 | C-3 | C-4 | C-5 | D-1 |
| Average polymerization degree | 600 | 600 | 600 | 300 | 900 | 600 |
| Chlorine content (%) | 60 | 63 | 68 | 60 | 60 | 57 |

TABLE 1

| | Copolymer (E) | | | | | | | | | | | | |
|---|---|---|---|---|---|---|---|---|---|---|---|---|---|
| | E-1 | E-2 | E-3 | E-4 | E-5 | E-6 | E-7 | E-8 | E-9 | E-10 | E-11 | E-12 | E-13 |
| | (Amounts in parts) | | | | | | | | | | | | |
| AN | 12 | 12 | 12 | 7 | 30 | 12 | 12 | 12 | 0 | 0 | 50 | 12 | 0 |
| BA | 60 | 60 | 60 | 60 | 60 | 40 | — | — | 60 | 60 | 50 | 20 | 100 |
| EA | — | — | — | — | — | — | 60 | — | — | — | — | — | — |
| 2EHA | — | — | — | — | — | — | — | 60 | — | — | — | — | — |
| St | 18 | 28 | 8 | 23 | 5 | 38 | 18 | 18 | 30 | 10 | — | 60 | — |
| αs | 10 | — | — | 10 | 5 | 10 | 10 | 10 | 10 | — | — | 10 | — |
| MMA | — | — | 20 | — | — | — | — | — | — | 30 | — | — | — |

AN: Acrylonitrile
BA: Butyl acrylate
EA: Ethyl acrylate
2HEA: 2-Ethylhexyl acrylate
St: Styrene
αS: α-Methyl styrene
MMA: Methyl methacrylate

TABLE 2

| | Copolymer (A) | | | | |
|---|---|---|---|---|---|
| | A-1 | A-2 | A-3 | A-4 | A-5 |
| αS | 72 | 42 | 90 | 72 | 72 |
| AN | 28 | 28 | 5 | 28 | 28 |
| St | — | 30 | — | — | — |
| Reduced viscosity | 0.31 | 0.32 | — | 0.17 | 0.60 |

TABLE 5

Nonflammable Injection-Molding Resin Composition

| | Kind of resins | | | | | Ratio of resins (Parts) | | | | |
|---|---|---|---|---|---|---|---|---|---|---|
| | Nonflammable resin composition (R) | | | | | | Nonflammable resin composition (R) | | | |
| | Copolymer (A) | Graft copolymer (B) | Post-chlorinated vinyl chloride resin (C) | Polyvinyl chloride resin (D) | Copolymer (E) | (A) | (B) | (C) | (D) | Copolymer (E) |
| Example | | | | | | | | | | |
| 1 | A-1 | B-1 | C-1 | D-1 | E-1 | 35 | 15 | 50 | 0 | 5 |
| 2 | A-1 | B-1 | C-1 | D-1 | E-2 | 35 | 15 | 50 | 0 | 5 |
| 3 | A-1 | B-1 | C-1 | D-1 | E-3 | 35 | 15 | 50 | 0 | 5 |
| 4 | A-1 | B-1 | C-1 | D-1 | E-4 | 35 | 15 | 50 | 0 | 5 |
| 5 | A-1 | B-1 | C-1 | D-1 | E-5 | 35 | 15 | 50 | 0 | 5 |
| 6 | A-1 | B-1 | C-1 | D-1 | E-6 | 35 | 15 | 50 | 0 | 5 |
| 7 | A-1 | B-1 | C-1 | D-1 | E-8 | 35 | 15 | 50 | 0 | 5 |
| 8 | A-1 | B-1 | C-1 | D-1 | E-9 | 35 | 15 | 50 | 0 | 5 |
| 9 | A-1 | B-2 | C-1 | D-1 | E-1 | 35 | 15 | 50 | 0 | 5 |
| 10 | A-1 | B-3 | C-1 | D-1 | E-1 | 35 | 15 | 50 | 0 | 5 |
| 11 | A-1 | B-1 | C-2 | D-1 | E-1 | 35 | 15 | 50 | 0 | 5 |
| 12 | A-1 | B-1 | C-1 | D-1 | E-1 | 35 | 15 | 40 | 10 | 5 |
| 13 | A-1 | B-1 | C-1 | D-1 | E-1 | 35 | 15 | 30 | 20 | 5 |
| Comparative Example | | | | | | | | | | |
| 1 | A-1 | B-1 | C-1 | D-1 | E-10 | 35 | 15 | 50 | 0 | 5 |
| 2 | A-1 | B-1 | C-1 | D-1 | E-11 | 35 | 15 | 50 | 0 | 5 |
| 3 | A-1 | B-1 | C-1 | D-1 | E-12 | 35 | 15 | 50 | 0 | 5 |
| 4 | A-1 | B-1 | C-1 | D-1 | E-13 | 35 | 15 | 50 | 0 | 5 |
| 5 | A-1 | B-1 | C-1 | D-1 | E-14 | 35 | 15 | 50 | 0 | 5 |
| 6 | A-1 | B-1 | C-1 | D-1 | E-1 | 35 | 15 | 50 | 0 | 0 |
| 7 | A-1 | B-1 | C-1 | D-1 | E-1 | 35 | 15 | 50 | 0 | 15 |
| 8 | A-2 | B-1 | C-1 | D-1 | E-1 | 35 | 15 | 50 | 0 | 5 |
| 9 | A-3 | B-1 | C-1 | D-1 | E-1 | 35 | 15 | 50 | 0 | 5 |
| 10 | A-4 | B-1 | C-1 | D-1 | E-1 | 35 | 15 | 50 | 0 | 5 |
| 11 | A-5 | B-1 | C-1 | D-1 | E-1 | 35 | 15 | 50 | 0 | 5 |
| 12 | A-1 | B-4 | C-1 | D-1 | E-1 | 35 | 15 | 50 | 0 | 5 |
| 13 | A-1 | B-5 | C-1 | D-1 | E-1 | 35 | 15 | 50 | 0 | 5 |
| 14 | A-1 | B-6 | C-1 | D-1 | E-1 | 35 | 15 | 50 | 0 | 5 |
| 15 | A-1 | B-7 | C-1 | D-1 | E-1 | 35 | 15 | 50 | 0 | 5 |
| 16 | A-1 | B-1 | C-3 | D-1 | E-1 | 35 | 15 | 50 | 0 | 5 |
| 17 | A-1 | B-1 | C-4 | D-1 | E-1 | 35 | 15 | 50 | 0 | 5 |
| 18 | A-1 | B-1 | C-5 | D-1 | E-1 | 35 | 15 | 50 | 0 | 5 |
| 19 | A-1 | B-1 | C-1 | D-1 | E-1 | 10 | 3 | 87 | 0 | 5 |
| 20 | A-1 | B-1 | C-1 | D-1 | E-1 | 85 | 5 | 10 | 0 | 5 |
| 21 | A-1 | B-1 | C-1 | D-1 | E-1 | 25 | 50 | 25 | 0 | 5 |
| 22 | A-1 | B-2 | C-1 | D-1 | E-10 | 35 | 15 | 50 | 0 | 5 |
| 23 | A-1 | B-3 | C-1 | D-1 | E-10 | 35 | 15 | 50 | 0 | 5 |
| 24 | A-1 | B-1 | C-2 | D-1 | E-10 | 35 | 15 | 50 | 0 | 5 |
| 25 | A-1 | B-1 | C-1 | D-1 | E-10 | 35 | 15 | 40 | 10 | 5 |
| 26 | A-1 | B-1 | C-1 | D-1 | E-10 | 35 | 15 | 30 | 20 | 5 |
| 27 | A-1 | B-3 | C-1 | D-1 | E-1 | 35 | 15 | 50 | 0 | 0 |

TABLE 6

| | Properties | | | | |
|---|---|---|---|---|---|
| | Non-peeling property of molded article | Heat resistance [°C.] | Impact Strength [kg-cm/cm] | Moldability [mm] | Nonflammability |
| Example | | | | | |
| 1 | 5 | 87.2 | 17.3 | 460 | V-0 |
| 2 | 5 | 87.5 | 17.6 | 455 | V-0 |
| 3 | 5 | 86.8 | 19.5 | 460 | V-0 |
| 4 | 4 | 87.9 | 17.8 | 465 | V-0 |
| 5 | 4 | 87.8 | 16.9 | 450 | V-0 |
| 6 | 5 | 87.7 | 18.2 | 450 | V-0 |
| 7 | 5 | 87.8 | 18.0 | 450 | V-0 |

TABLE 6-continued

| | Properties | | | | |
|---|---|---|---|---|---|
| | Non-peeling property of molded article | Heat resistance [°C.] | Impact Strength [kg-cm/cm] | Moldability [mm] | Nonflammability |
| 8 | 5 | 87.6 | 18.3 | 460 | V-0 |
| 9 | 5 | 88.4 | 28.3 | 420 | V-0 |
| 10 | 4 | 85.8 | 10.4 | 530 | V-0 |
| 11 | 5 | 92.3 | 17.0 | 360 | V-0 |
| 12 | 5 | 86.4 | 17.4 | 500 | V-0 |
| 13 | 5 | 85.2 | 18.5 | 525 | V-0 |
| Comparative Example | | | | | |
| 1 | 1 | 87.5 | 13.3 | 465 | V-0 |
| 2 | 2 | 86.8 | 14.2 | 460 | V-0 |
| 3 | 1 | 88.1 | 10.4 | 440 | V-0 |
| 4 | 3 | 85.2 | 9.1 | 390 | V-0 |
| 5 | 1 | 86.1 | 11.2 | 470 | V-0 |
| 6 | 5 | 87.8 | 17.5 | 360 | V-0 |
| 7 | 1 | 83.4 | 10.3 | 500 | V-0 |
| 8 | 4 | 80.3 | 15.6 | 460 | V-0 |
| 9 | Copolymer (A) being not polymerizable | | | | |
| 10 | 3 | 84.3 | 5.4 | 570 | V-0 |
| 11 | 2 | 88.0 | 27.0 | 220 | V-0 |
| 12 | 4 | 86.7 | 6.7 | 460 | V-0 |
| 13 | 1 | 86.3 | 6.4 | 450 | V-0 |
| 14 | 2 | 86.5 | 7.1 | 400 | V-0 |
| 15 | 1 | 86.9 | 6.3 | 490 | V-0 |
| 16 | 2 | 94.3 | 15.2 | 300 | V-0 |
| 17 | 2 | 85.4 | 6.2 | 560 | V-0 |
| 18 | 2 | 87.2 | 29.3 | 310 | V-0 |
| 19 | 2 | 70.2 | 8.9 | 500 | V-0 |
| 20 | 3 | 96.3 | 5.3 | 420 | V-2 |
| 21 | 2 | 73.8 | 24.3 | 390 | V-0 |
| 22 | 1 | 88.6 | 24.2 | 320 | V-0 |
| 23 | 1 | 86.0 | 6.8 | 410 | V-0 |
| 24 | 1 | 92.5 | 12.3 | 260 | V-0 |
| 25 | 1 | 86.3 | 12.2 | 490 | V-0 |
| 26 | 1 | 85.4 | 13.4 | 515 | V-0 |
| 27 | 4 | 86.0 | 10.5 | 440 | V-0 |

What is claimed is:

1. A nonflammable injection-molding resin composition superior in impact strength, non-peeling property, and moldability, said resin composition consisting of 100 parts by weight of a nonflammable composition of (i) 15 to 80 parts by weight of a copolymer (A) being composed of 60 to 85% by weight of α-methylstyrene monomer units, 15 to 35% by weight of vinyl cyanide monomer units, and 0 to 20% by weight of units of another copolymerizable vinyl monomer, said copolymer (a) having a methyl ethyl ketone-soluble portion having a reduced viscosity of 0.12 to 0.5 dl/g in N,N-dimethylformamide at a temperature of 30° C. and a concentration of 0.3 g/dl, (ii) 5 to 40 parts by weight of a graft copolymer (B) prepared by graft-copolymerizing, onto 40 to 90 parts by weight of a rubbery polymer, 10 to 60 parts by weight of a monomer mixture comprising 10 to 90% by weight of a vinyl cyanide monomer and/or an alkyl (meth) acrylate monomer, 10 to 90% by weight of an aromatic vinyl monomer, and 0 to 20% by weight of another vinyl monomer copolymerizable therewith, (iii) 20 to 70 parts by weight of a post-chlorinated vinyl chloride resin (C) containing chlorine in an amount of 58 to 65% and prepared by chlorinating a vinyl chloride resin having a polymerization degree of 400 to 800, and (iv) 0.5 to 10 parts by weight of a copolymer (E) comprising 5 to 40% by weight of vinyl cyanide monomer units, 30 to 95% by weight of alkyl acrylate monomer units, and 0 to 65% by weight of units of another copolymerizable vinyl monomer.

2. A nonflammable injection-molding resin composition as claimed in claim 1, wherein a copolymer (A) has a reduced viscosity of 0.2 to 0.4 dl/g.

3. A nonflammable injection-molding resin composition claimed in claim 1, wherein the polymerization degree of the post-chlorinated vinyl chloride resin (C) is 400 to 700.

* * * * *